Oct. 18, 1927.
M. FORSTER
PISTON RING
Filed Jan. 5, 1926
1,646,143
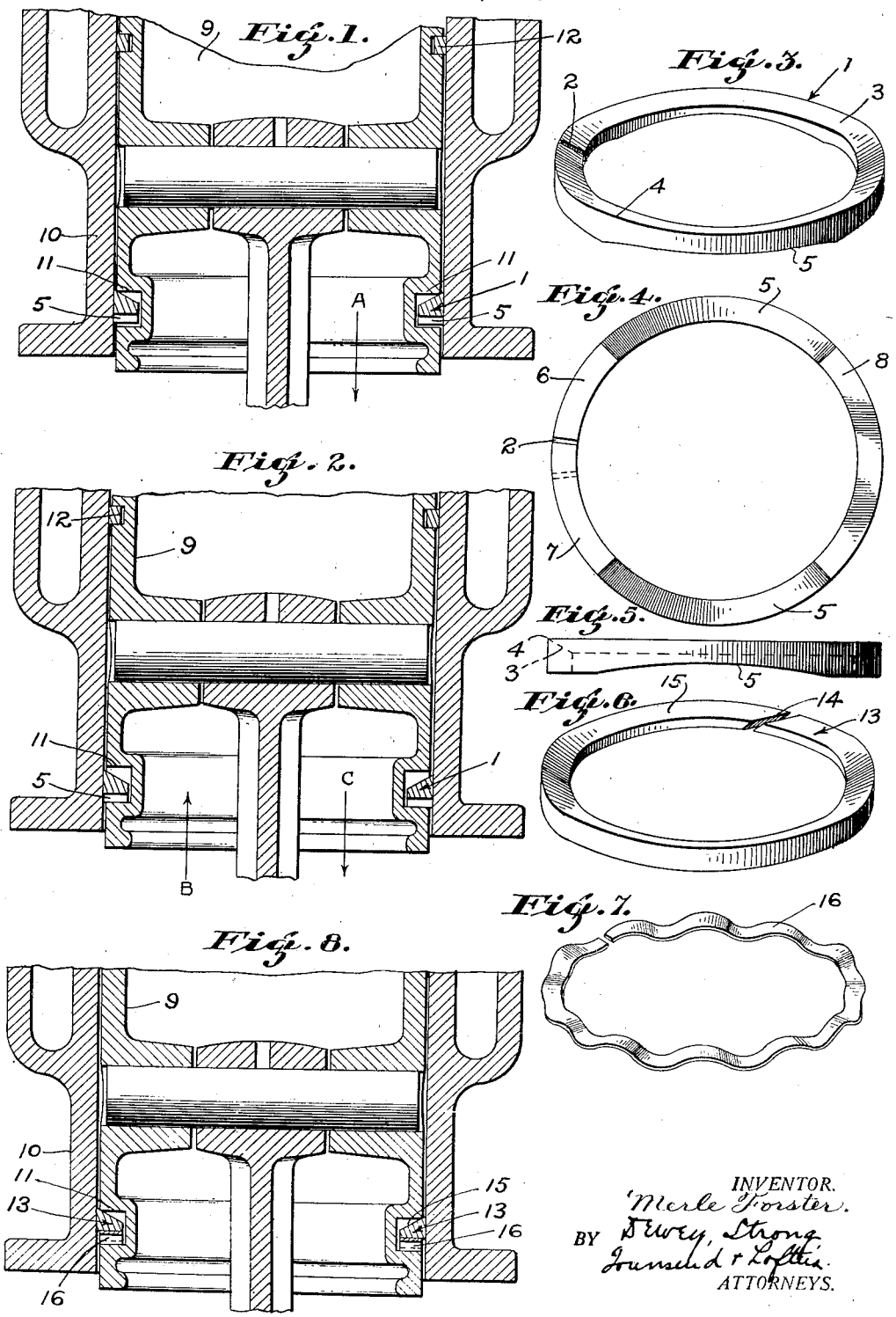
INVENTOR.
Merle Forster.
BY Dewey, Strong
Townsend & Loftus
ATTORNEYS.

Patented Oct. 18, 1927.

1,646,143

UNITED STATES PATENT OFFICE.

MERLE FORSTER, OF OAKLAND, CALIFORNIA.

PISTON RING.

Application filed January 5, 1926. Serial No. 79,284.

This invention relates to piston rings and particularly to a piston ring for preventing the passage of oil upwardly by the piston into the combustion chamber of an engine. I am aware that many rings have been devised for this purpose and that such rings function with varying degrees of success. Ordinarily, one ring of this type is mounted in each piston beneath the usual compression rings thereon. The action of these rings heretofore has been to scrape the oil from the cylinder wall either on the up or down stroke of the piston, holes ordinarily being provided through the piston for the passage of this oil. My improved ring functions in a similar manner, but in addition thereto, provides a seal for preventing the suction of oil upwardly past the ring during the suction stroke of the piston, and permitting free passage of oil downwardly past the ring during the firing and compression strokes. These functions are accomplished by mounting the ring to have a slight movement in the piston groove longitudinally of the piston. A clearance passage is also provided beneath the ring for permitting the return of the oil to the crank case, thus avoiding the necessity of providing such a passage through the piston. It is the object of my invention to provide an improved oil piston ring of this type.

In the accompanying drawing, I have illustrated certain specific embodiments of my invention, but it will be understood that the invention can be otherwise embodied and that the drawing is not to be construed as defining or limiting the scope of the invention, the claims appended to this specification being relied upon for that purpose.

Referring to the figures of the drawing:

Figure 1 is a longitudinal sectional view through a cylinder and piston having my improved oil ring mounted therein, the parts being shown with the piston on the suction stroke.

Figure 2 is a similar view showing the ring in the position it occupies during the compression and firing strokes of the piston.

Figure 3 is a perspective view of the ring.

Figure 4 is a bottom plan view thereof.

Figure 5 is an edge view thereof.

Figure 6 is a perspective view of a modified form of my improved ring.

Figure 7 is a spacing ring for cooperating with the ring shown in Figure 6.

Figure 8 is a view similar to Figure 1, but illustrating the use of the rings shown in Figures 6 and 7.

Referring first to Figs. 1 to 5 of the drawing, 1 indicates my improved oil ring split at 2 in any well known manner. The upper end face 3 of the ring is beveled to provide an acute-angled outer edge 4, adapted to engage the cylinder wall. The lower end face of the ring is recessed thereacross at 5. I preferably form each of these recesses to extend about 90° around the ring and space the recesses like distances from the split 2. This provides a thick portion 8 located diametrically opposite the point where the ring is split at 2. The recesses 5 provide resilient side portions lying at opposite sides of the point at which the ring is split. By this construction the ring is stiffened diametrically opposite the point at which it is split and its resiliency is increased between the two points without varying the width of the material of which the ring is constructed. Such construction provides bearing faces 6, 7 and 8 for the ring. The recesses 5 are preferably made by grinding the same into the ring on a grinding wheel. The configuration of the recess as thus formed is shown at Figure 5.

The manner of mounting the ring and the use thereof are illustrated in Figs. 1 and 2. A piston 9 is mounted in a cylinder 10, my improved ring being mounted in a groove 11 in the piston. It will be noted that the ring is mounted in the groove in a manner having a slight movement therein longitudinally of the piston, it being understood however that this movement is considerably enlarged as illustrated in the drawing.

The operation of the ring is substantially as follows.

The ring normally spreads outwardly in a manner resiliently engaging the cylinder walls. When the piston is moving downwardly in the direction of the arrow A on the suction stroke, the edge 4 of the ring wedges upwardly to the position shown in Figure 1, in a manner tightly sealing the space between the piston and cylinder wall and forming a sealing line contact between the upper face of the ring and the outer peripheral edge of the wall 11. The wedging of the ring is caused both by the resilient engagement thereof with the cylinder wall and the vacuum produced above the ring in the suction stroke. Thus, any pumping of oil past the ring during the suction stroke is positively prevented. When the piston reverses and moves upwardly (arrow B) on the compression stroke, the ring takes the position indicated in Fig. 2. This positioning of the ring is due both to the resilient engagement of the ring with the cylinder wall and the pressure produced above the ring on the compression stroke. During the upward movement of the piston, any oil which may be on the cylinder walls is scraped by the ring edge 4 into the piston groove 11. The compression gases which escape past the rings 12 assist in blowing this oil into the groove 11 and outwardly through the recesses 5 formed in the bottom face of the ring. Thus, on the compression stroke, any oil which may be on the cylinder wall about the ring 1 is carried into the piston groove and forced downwardly and outwardly thereof into the crank case.

When the piston again reverses and moves downwardly (arrow C) on the firing stroke, the exploded gases which get past the rings 12, hold the ring 1 in the position shown in Fig. 2 and the gases move downwardly through the space between the upper edge of the groove 11 and the ring 1. Any oil is thereby prevented from entering the chamber above the ring 1 on this stroke and any oil on the cylinder walls or in the groove 11 is blown downwardly into the crank case. Thus, on the firing stroke it is impossible for any oil to enter the combustion chamber and any oil which may be on its way to such chamber is blown back into the crank case.

In Figs. 6, 7 and 8, I have illustrated a modified form of my invention. In this form of the invention, my ring is made in two parts. The ring proper 13 is split at 14 and beveled on its upper face 15 in the same manner as ring 1. The lower face of this ring is plane. A resilient spacing ring 16, preferably corrugated as illustrated, is adapted to cooperate with the lower face of the ring 13. When mounted in the piston groove 11, the ring 13 is normally held upward in its sealing position as illustrated in Fig. 8. The corrugations in the ring 16 provide clearance spaces beneath the ring 13 to permit oil scraped from the cylinder and entering the piston groove 11 to pass outwardly therethrough. The operation of this ring is the same as that of the ring 1 above described.

It will of course be understood that the oil ring has only a very slight movement in the piston groove 11 and that this spacing and other features of the invention have been considerably exaggerated in the drawing for the purpose of more clearly illustrating my invention.

Having thus described my invention, what I claim is:

1. A split oil piston ring having one end face thereof smooth and beveled to provide an uninterrupted acute-angled outer edge adapted to engage the wall of a cylinder to form a continuous seal, and the other end face being recessed thereacross to permit oil to pass therethrough beneath the ring.

2. A split oil piston ring having one end face thereof smooth and beveled to provide an uninterrupted acute-angled outer edge adapted to engage the wall of a cylinder, and the other end face being provided with a pair of diametrically opposite recesses therein on opposite sides of the split in the ring.

3. A split oil piston ring having one end face thereof smooth and beveled to provide an uninterrupted acute-angled outer edge adapted to engage the wall of a cylinder, and the other end face being provided with a pair of diametrically opposite recesses therein on opposite sides of the split in the ring, the recesses being spaced like distances from the split and each extending substantially 90° around the ring.

4. In combination, an engine cylinder, a piston therein having a groove therearound, a split ring mounted in the groove in a manner having a slight movement therein longitudinally of the piston, the upper face of the ring being smooth and beveled to provide an uninterrupted acute-angled outer edge engaging the wall of the cylinder, and means providing clearance spaces beneath the ring to permit oil scraped from the cylinder and entering the piston groove to pass outwardly therethrough, the movement of the ring causing it to form a continuous oil seal when at the upward limit of its movement and to form an upper oil escape groove when at the lower limit of its movement.

5. In combination, an engine cylinder, a piston therein having a groove therearound, a split ring mounted in the groove in a manner having a slight movement therein longitudinally of the piston, the upper face of the ring being smooth and beveled to provide an uninterrupted acute-angled outer edge engaging the wall of the cylinder, and the lower face of the ring being recessed thereacross to permit oil to pass therethrough beneath the ring, the movement of the ring causing it to form a continuous oil seal when at the upward limit of its movement and to form an upper oil escape groove when at the lower limit of its movement.

6. In combination, an engine cylinder, a piston therein having a groove therearound, a split ring mounted in the groove in a manner having a slight movement therein longitudinally of the piston, the upper face of the ring radially being relatively angular to the adjacent upper wall of the groove whereby the outer peripheral edge of the said upper wall forms a sealing line contact with the said upper face of the ring upon downward movement of the piston, and means providing clearance spaces beneath the ring to permit oil scraped from the cylinder and entering the piston groove to move outwardly therethrough.

7. A split oil ring provided at its lower face with a pair of diametrically opposite recesses therein on opposite sides of the split in the ring, the recesses being spaced apart by relatively thick diametrically opposite thick portions, one of the thick portions being divided by the splitting of the ring and the material of the ring being of uniform width throughout its entire circumference.

MERLE FORSTER.